(No Model.)
S. KING.
THRASHING MACHINE.
No. 419,959. Patented Jan. 21, 1890.
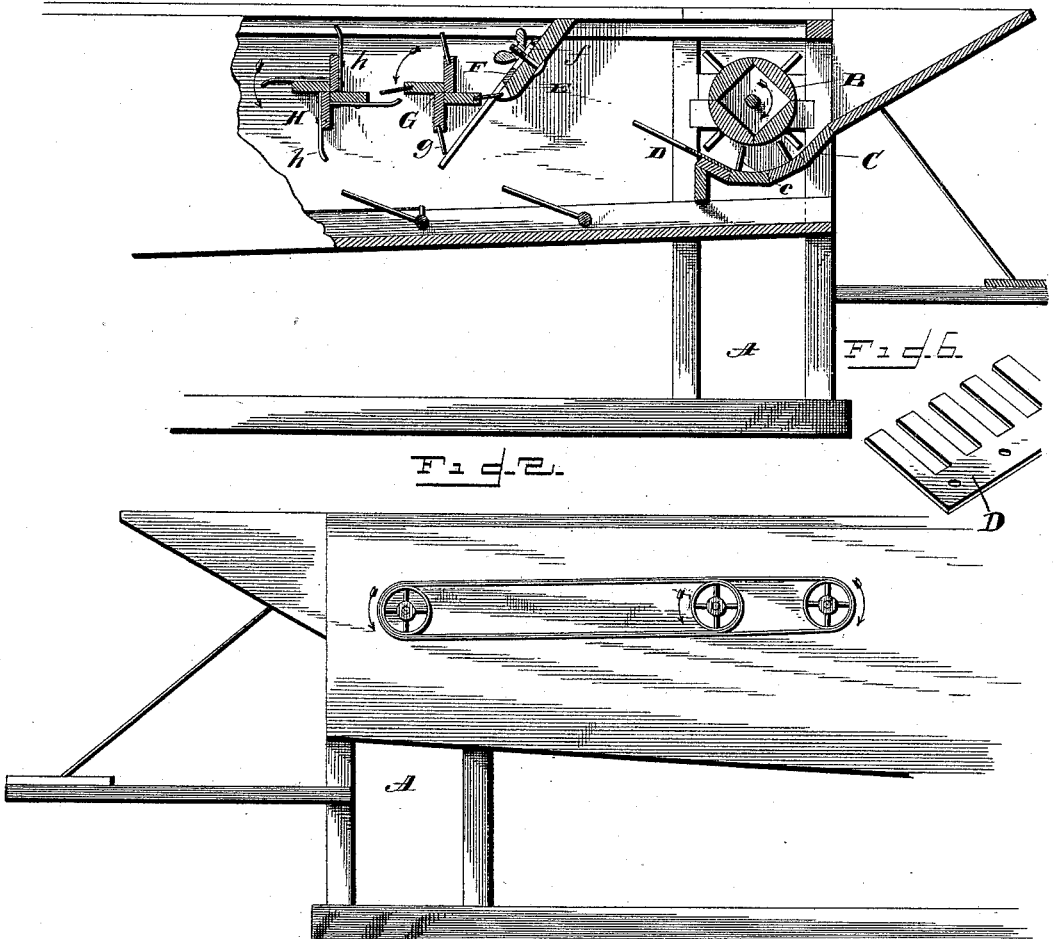
WITNESSES
G. S. Elliott.
E. W. Johnson
Sylvester King
INVENTOR
Attorney

UNITED STATES PATENT OFFICE.

SYLVESTER KING, OF OWENSVILLE, INDIANA.

THRASHING-MACHINE.

SPECIFICATION forming part of Letters Patent No. 419,959, dated January 21, 1890.

Application filed June 2, 1887. Renewed December 5, 1889. Serial No. 332,639. (No model.)

*To all whom it may concern:*

Be it known that I, SYLVESTER KING, a citizen of the United States of America, residing at Owensville, in the county of Gibson and State of Indiana, have invented certain new and useful Improvements in Thrashing-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements in grain-separators; and it consists more especially in the construction and combination of the parts, as will be hereinafter fully set forth, whereby the straw is directed properly to the deflectors, and is then thrown downwardly, the grain being separated therefrom, the construction being such that the straw is prevented from becoming attached to the beaters, as will be hereinafter fully set forth, and specifically pointed out in the claim.

In the accompanying drawings, which illustrate my invention, Figure 1 is a longitudinal sectional view of a portion of a grain separator, showing my invention applied thereto. Fig. 2 is a side view of the same. Figs. 3 and 4 are detail perspective views of the beaters. Fig. 5 is a side view of a portion of the deflector, and Fig. 6 is a detail perspective view of the straw-guide.

A refers to the frame of the grain-separator, which may be of ordinary construction, as shown in Patent No. 167,570, granted September 7, 1875, upon which my invention is designed to be an improvement, the parts which are not illustrated being constructed substantially as shown in the aforesaid patent.

B refers to the cylinder, which is provided with a series of teeth which pass between a transverse series of teeth c, which project upwardly from the concave C.

The straw is fed in the usual manner between the cylinder and the concave, and, after being separated, is guided by the straw-guide D, which is attached to the concave so as to project inwardly and upwardly at about an angle of forty-five degrees. The straw-guide is provided with a series of teeth, through which the grain, which has been separated from the straw by the action of the cylinder and concave, falls upon a pan or other suitable receptacle beneath the shakers.

To the upper portion of the separator is secured a transverse board E, which projects downwardly and rearwardly, preferably, at an angle of about forty degrees, as shown, and to the rear side thereof is attached a toothed plate F, provided with slots $ff$, through which pass bolts having thumb-nuts for securing the toothed plate to the deflector E, so that it can be adjusted thereon to suit the different conditions of the grain and bring the same nearer or farther away from the teeth $g$ of the beater G.

The beater G, as shown in Fig. 3, is made up of a series of transverse boards, which are joined to each other centrally, and is provided with gudgeons secured thereon, whereby it is revolubly mounted in the sides of the casing, and wire teeth $g$, set at a slight angle with respect to the edges of the boards to which they are secured.

H refers to a beater of substantially the same formation and is provided with plates $h$, having a series of slots $h'$, forming teeth, between which the teeth $g$ of the beater G pass. The serrated or toothed edges of these metallic strips $h$ are bent, as shown.

Beneath the beaters and deflectors are a series of carriers, which will feed the straw downwardly to the discharge-opening and permit the grain to fall between them upon the necessary pan, which guides the same to a fan for cleaning.

The cylinder and beaters are rotated by suitable belts, which pass over pulleys, and, if desirable, these belts and pulleys can be arranged as shown in Fig. 2, there being a short belt connecting the pulleys of the cylinder with the pulley of the beater G, and a long belt which passes over the first-mentioned belt and connects the pulley on the beater H, said belt passing over and around the shorter belt, by which construction the beater H will be caused to rotate slightly faster than the cylinder and beater G.

The teeth of the beaters G and H are bent at an inclination in the direction of the line of movement of said beaters, and by this construction the tendency of the teeth of the beater H will be to draw the hay or straw upward, while the wire teeth of the beater G have a reverse movement and pass downward through the teeth of the beater H. The said arrangement of the teeth of beater G also facilitates the action thereof with the slotted plate F, as said teeth pass through the slots of and between the teeth of plate F, and, engaging with the hay or straw, draw the same upward against the said plate F.

I claim—

In a thrashing-machine, the combination, substantially as before set forth, of a plate adjustably mounted at a rearward incline and provided with teeth which extend down adjacent to the shaker of the machine, the beater G, having wire teeth adapted to pass through the teeth of the inclined adjustable plate, and the beater H, having plates $h$, slotted to form teeth, through which the wire teeth of the beater G also pass, said beaters and adjustable plate being arranged in direct alignment.

In testimony whereof I affix my signature in presence of two witnesses.

SYLVESTER KING.

Witnesses:
W. T. KIDNEY,
WM. R. CLARK.